June 7, 1966  J. P. WAGNER  3,254,662
DIFFERENTIAL PRESSURE CONTROLLER
Filed Dec. 9, 1963  2 Sheets-Sheet 1

INVENTOR.
JOSEPH P. WAGNER
BY
Candor & Candor
HIS ATTORNEYS

June 7, 1966  J. P. WAGNER  3,254,662
DIFFERENTIAL PRESSURE CONTROLLER
Filed Dec. 9, 1963  2 Sheets-Sheet 2

INVENTOR.
JOSEPH P. WAGNER
BY
Caudn & Caudn
HIS ATTORNEYS

United States Patent Office 3,254,662
Patented June 7, 1966

3,254,662
DIFFERENTIAL PRESSURE CONTROLLER
Joseph P. Wagner, Knoxville, Tenn., assignor to Robertshaw Controls Company, Richmond, Va., a corporation of Delaware
Filed Dec. 9, 1963, Ser. No. 329,019
10 Claims. (Cl. 137—86)

This invention relates to an improved differential pressure controller or the like.

It is well known that a fluid system can be provided wherein the pressure differential across an orifice means disposed in the fluid system can be set at a selected pressure differential by a controlling means or the like so that the controlling means will vary the input of flow of fluid to the orifice means to maintain the pressure differential across the orifice means at the selected pressure differential.

This invention is to provide an improved differential pressure controller to be utilized in such a system or the like, the differential pressure controller of this invention having many novel features as will be apparent hereinafter.

For example, the differential pressure controller of this invention is a two-mode stack type controller which operates on the forced balance principle. A non-adjustable, wide proportional mode provides stability for the controller while the adjustable reset mode is effective in achieving close control (minimum offset) in the presence of a changing load condition.

While the particular differential pressure controller of this invention has been designed for a range of approximately 20 to 300 inches of water differential and to withstand a maximum static pressure of 150 p.s.i. applied to either side of the measuring end, it is to be understood that such ranges are merely examples of one embodiment of this invention and are not a limitation on the appended claims.

The object of this invention is to provide an improved differential pressure controller or the like having one or more of the novel features hereinafter illustrated or described.

Other objects, uses and advantages of this invention are apparent from a reading of this description which proceeds with reference to the accompanying drawings forming a part thereof and wherein.

Figure 1:
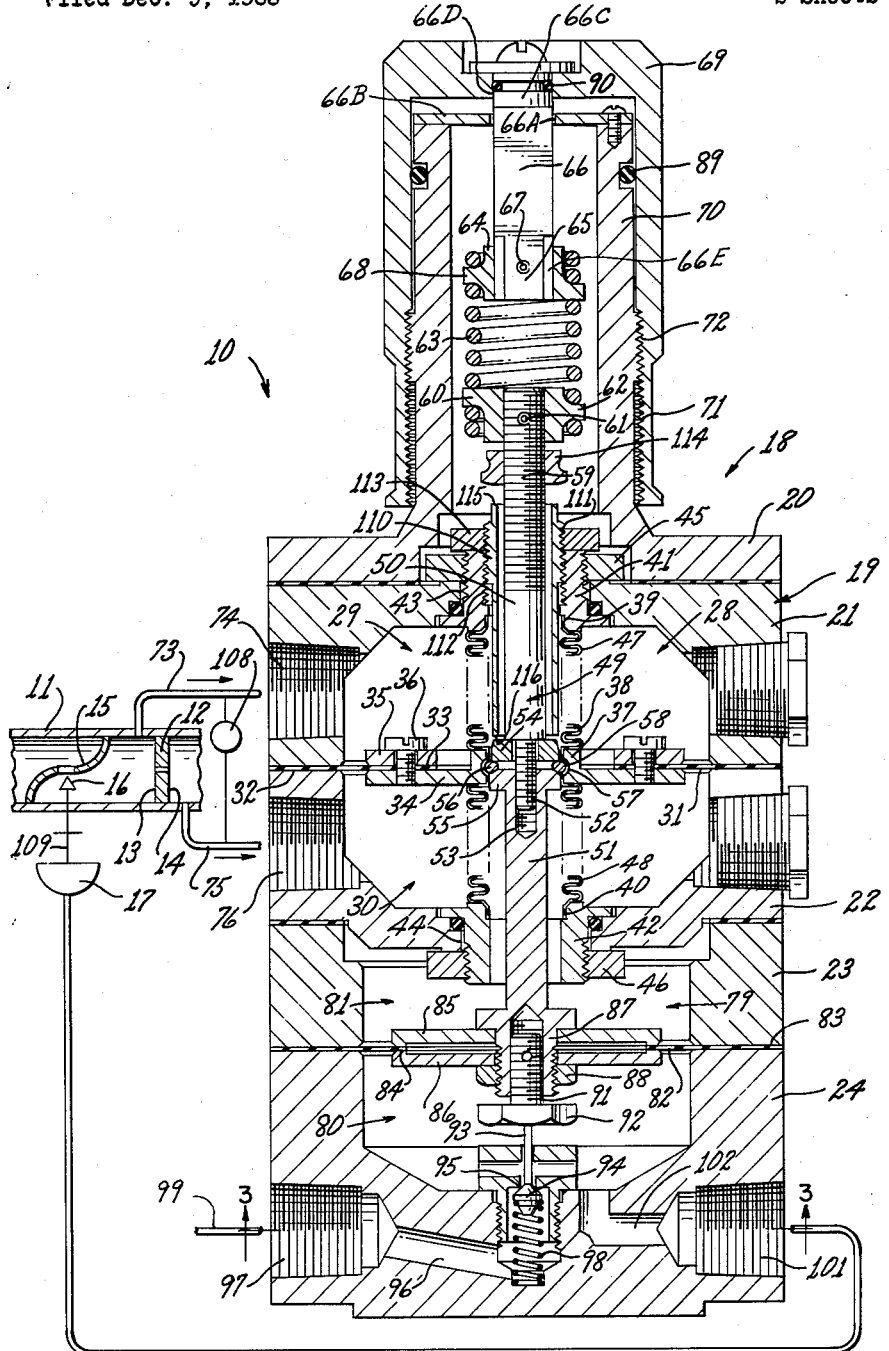
FIGURE 1 is a schematic view of the fluid system of this invention with the differential pressure controller of this invention illustrated in cross section.

While the various features of this invention are hereinafter described and illustrated as being particularly adaptable for controlling the pressure differential across an orifice means in a fluid system or the like, it is to be understood that the various features of this invention can be utilized singly or in any combination thereof to provide means for controlling other types of systems as desired. Therefore, this invention is not to be limited to only the embodiment illustrated in the drawings, because the drawings are merely utilized to illustrate one of the wide variety of uses of this invention.

Referring now to FIGURE 1, a fluid system of is generally indicated by the reference numeral 10 and comprises a conduit means 11 or the like having an orifice means 12 therein so that a desired pressure differential can be maintained between the inlet ide 13 of the orifice means 12 and the outlet side 14 thereof.

A valve seat 15 is disposed in the conduit means 11 upstream from the orifice means 12 and is controlled by a valve member 16 under the regulation of a pneumatic actuator 17 or the like.

For example, should the pressure differential across the orifice means 12 exceed a selected pressure differential in a manner hereinafter described, the actuator means 17 will cause the valve member 16 to move closer to the valve seat 15 to decrease the flow of fluid through the conduit 11 to the orifice means 12 in an amount to bring the pressure differential across the orifice means 12 back to the selected pressure differential.

One means of this invention for causing regulation of the actuator 17 comprises a differential pressure controller generally indicated by the reference numeral 18 in FIGURE 1 and operated in a manner hereinafter set forth.

Thus, it can be seen that the fluid system 10 is readily adaptable to maintain a desired pressure differential across the orifice means 12 regardless of the flow conditions through the conduit 11.

Figure 2:
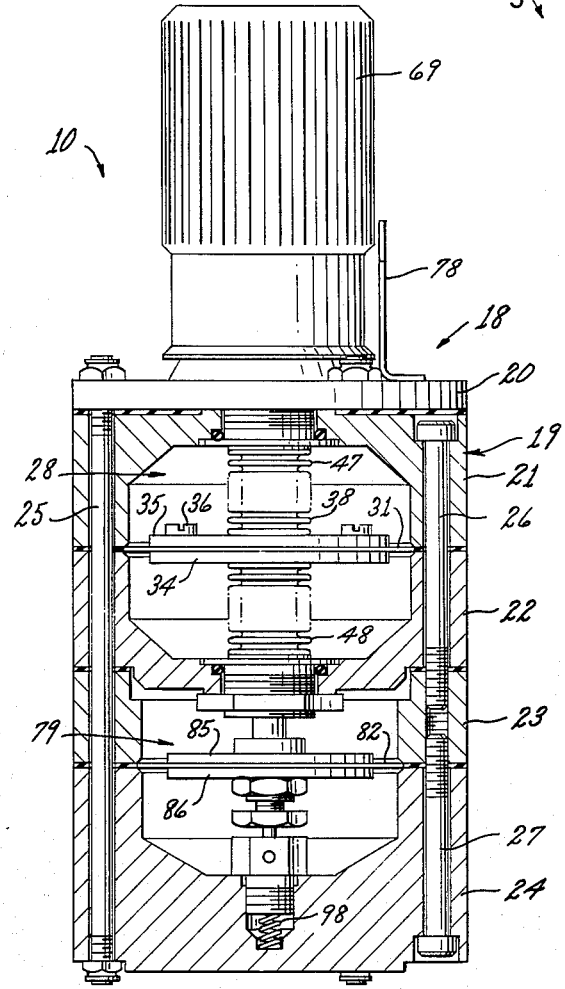
FIGURE 2 is a reduced view of the differential pressure controller illustrated in FIGURE 1 and illustrates various parts thereof in elevation.

The differential pressure controller 18 comprises a housing 19 formed of a plurality of housing members 20, 21, 22, 23 and 24 secured together in stacked relation by a plurality of fastening means 25, 26 and 27 in the manner illustrated in FIGURE 2.

The housing members 21 and 22 cooperate together to define a cavity 28 therebetween which is divided into two chambers 29 and 30 by a flexible diaphragm 31, the flexible diaphragm 31 having its outer periphery 32 secured between the housing members 21 and 22.

The inner periphery 33 of the flexible diaphragm 31 is secured to a diaphragm plate 34 by an annular retainer 35 and bolts 36, the inner periphery 33 of the diaphragm 31 being sandwiched between the diaphragm plate 34 and the retainer plate 35.

The inner portion 37 of the diaphragm plate 34 is interconnected to a bellows assembly 38 having its opposed ends 39 and 40 respectively secured to hollow bellow heads 41 and 42 received in bores 43 and 44 formed through the end walls of the housing members 21 and 22, the bellows heads 41 and 42 received in bores 43 and 44 formed through the end walls of the housing members 21 and 22, the bellows heads 41 and 42 being secured to the housing members 21 and 22 by lock nuts 45 and 46 in the manner illustrated in FIGURE 1.

While the novel features of the bellows assembly 38 illustrated in FIGURE 1 are disclosed and claimed in the copending patent application, S.N. 143,889, filed October 9, 1961, now Patent No. 3,181,432 and entitled "Differential Pressure Transmitter and Parts Therefor or the Like," sufficient detail of the bellows assembly 38 will now be described in order to fully understand the operation of the controller 18 of this invention.

Since the bellows assembly 38 defines two bellows constructions 47 and 48 on opposite sides of the flexible diaphragm 31, the two bellows constructions 47 and 48 must have closely matched areas to eliminate any motion due to static pressure variations in the chambers 29 and 30 for a purpose hereinafter described because the position of the bellows assembly 38 must be the same for a specific pressure differential between the chambers 29 and 30 even though the pressure level or static pressure may vary over a wide range of values.

In order to achieve this uniformity of bellows areas, the two bellows constructions 47 and 48 are formed at the same time and from a single tube in order to take advantage of the same specific heat treatment, wall thickness, material and the like as set forth in the aforementioned copending patent application.

The tube forming the bellows assembly 38 is first assembled to the diaphragm plate 34 before the bellows constructions 47 and 48 are formed whereby the bellows assembly 38 and the diaphragm plate 34 are assembled together during the formation of the bellows constructions 47 and 48.

Thus, it can be seen that the bellows assembly 38 cooperates with the diaphragm 31 to seal close the chambers 29 and 30 from each other.

The flexible diaphragm 31 is interconnected to a rigid stem means 49 in a manner now to be described, the rigid stem means 49 passing through the bellows assembly 38.

The rigid stem means 49 comprises upper and lower shaft-like members 50 and 51 interconnected together by a threaded end 52 of the member 50 being received in a threaded bore 53 in the member 51.

In order to interconnect the stem means 49 with the diaphragm 31, a washer-like member 54 is sandwiched between the members 50 and 51 and cooperates with an enlarged end 55 of the member 51 to outwardly expand a split ring 56 or the like, the outwardly expanding split ring 56 forcing a portion 57 of the bellows assembly 38 into an annular cavity 58 of the diaphragm plate 34 to interconnect the diaphragm plate 34 to the stem means 49 whereby movement of the flexible diaphragm 31 causes like movement of the rigid stem means 49.

The upper end 59 of the stem member 50 is externally threaded and has a flange member 60 affixed thereto in any suitable manner, such as by a set screw 61. The flange member 60 has a substantially helically wound flange 62 provided thereon and adapted to be disposed between coils of a coiled tension spring 63 in the manner illustrated in FIGURE 1.

The other end of the coiled tension spring 63 is likewise interconnected to a flange member 64 affixed to an end 65 of a shaft 66 by any suitable means, such as by a set screw 67, the flange member 64 having an outwardly directed flange 68 substantially helically wound around the same and disposed between coils of the spring 63 in the manner illustrated in FIGURE 1.

The shaft 66 is carried by a cup-shaped knob member 69 telescoping an outwardly directed portion 70 of the housing member 20, the knob 69 having internal threads 71 disposed in threaded relation with external threads 72 on the extension 70 of the housing member 20.

In this manner, the knob 69 can be adjusted relative to the housing 19 through the threaded relationship therewith whereby the end 65 of the shaft 66 will be moved inwardly or outwardly relative to the housing 19 to change the bias of the tension spring 63 tending to raise the diaphragm 31 upwardly in FIGURE 1.

The shaft 66 has a square cross-sectional configuration and passes through a complementary bore 66A in a plate 66B mounted to the upper end of extension 70, the shaft having a rounded end 66C to fit a hole 66D in knob 69 and to provide a groove for the O ring seal 90. The lower end 66E of the shaft 66 is machined on its corners to fit the flanged member 64. In this manner, no torque is transmitted to the spring 63 upon adjustment of the knob 69.

The chamber 29 of the controller 18 is interconnected to the conduit 11 of the system 10 at a point upstream from the orifice means 12 by a conduit 73 leading to a port 74 in the housing member 21.

Similarly, the chamber 30 of the controller 18 is interconnected to the conduit 11 at a point downstream from the orifice means 12 by a conduit 75 leading to a port 76 in the housing member 22.

Thus, it can be seen that the pressure differential across the orifice means 12 is applied to the diaphragm 31 whereby the high pressure is received in chamber 29 and the low pressure is received in chamber 30 so that the pressure differential between the chambers 29 and 30 tends to move the diphragm 31 downwardly in FIGURE 1 and carry the stem means 49 therewith.

However, such downward movement of the diaphragm 31 and stem means 49 is resisted by the force of the tension spring 63 tending to move the diaphragm 31 upwardly.

Therefore, it can be seen that by adjusting the knob 69 relative to the housing 19 in the manner previously described, the force of the tension spring 63 can be varied so that when a desired pressure differential exists across the orifice means 12, the diaphragm 31 is disposed in the position illustrated in FIGURE 1 whereby upon an increase in the differential pressure across the orifice means 12 from that selected by the tension spring 63 through the adjustment of the knob 69, the diaphragm 31 will move downwardly and will regulate the valve member 16 in a manner hereinafter described.

For example, a suitable indicator 78, FIGURE 2, can be carried by the housing member 20 to indicate the adjustment of the knob 69 relative to the housing 19 to select the desired pressure differential for the orifice means 12.

The housing members 23 and 24 cooperate together to define a cavity 79 therebetween, the cavity 79 being completely separate from the cavity 28 previously described.

The cavity 79 is divided into two chambers 80 and 81 by another flexible diaphragm 82 having its outer periphery 83 sandwiched between the housing members 23 and 24 and its inner periphery 84 clamped between a pair of diaphragm rings 85 and 86 carried on the end 87 of the stem member 51 by a lock nut 88 or the like, the diaphragm discs 85 and 86 having the sides thereof adjacent the diaphragm 82 relieved for good clamping at the outer peripheries thereof.

In order to prevent fluid leakage from chamber 81 through the bellows assembly 38, a seal 89 is disposed between the extension 70 of the housing member 20 and the adjusting knob 69. Also a seal 90 is disposed between the shaft 66 and the knob 69.

The end 87 of the stem member 51 carries an adjusting screw 91 having an enlarged head 92 adapted to engage a stem 93 of a pilot poppet valve member 94, the poppet valve member 94 being adapted to cooperate with a valve seat 95 disposed in passage means 96 leading from a port 97 to the chamber 80 for a purpose hereinafter described.

The poppet valve 94 is normally urged to the closed position against the valve seat 95 by a compression spring 98.

The port 97 of the housing member 24 is adapted to be interconnected to a source of supply pressure by means of a conduit 99, the supply pressure preferably being between 18 to 20 p.s.i. for a purpose hereinafter described.

The chamber 80 is also adapted to be interconnected to the actuator 17 of the valve member 16 by a conduit means 100 interconnected to a port 101 of the housing member 24, the port 101 being interconnected to the chamber 80 by passage means 102 in the manner illustrated in FIGURE 1.

Figure 4:
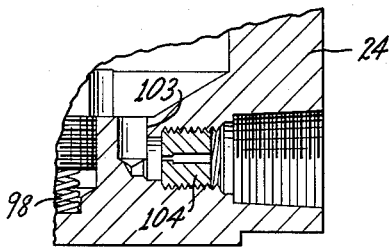
FIGURE 4 is a fragmentary, cross-sectional view taken substantially on line 4—4 of FIGURE 3.
Figure 3:
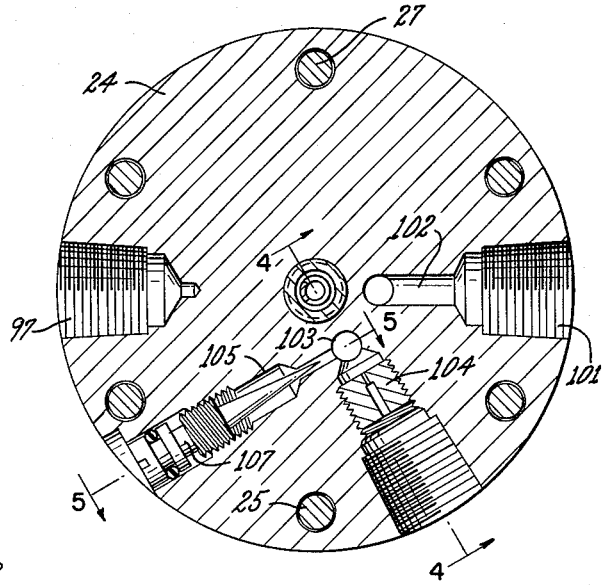
FIGURE 3 is a cross-sectional view taken on line 3—3 of FIGURE 1.

The chamber 80 of the controller 18 is also adapted to be interconnected to the exterior of the housing 19 by a passage means 103 formed in the housing member 24 in the manner illustrated in FIGURES 3 and 4, the passage means 103 having an orifice means 104 disposed therein and adapted to vent the chamber 80.

In the sizing of orifice 104, the factors of fast valve actuator 17 response and low air consumption must be considered. Enlarging orifice 104 results in fast response in the opening of valve 16 but it also results in high air consumption. Therefore, sizing of orifice is a compromise between the above two factors.

In addition, the size of orifice 104 will affect the sizing of pilot valve means 94, 95 since the pilot valve must be capable of not only supplying sufficient air to build pressure in chamber 80 in spite of the bleed through orifice 104, but must also have sufficient additional capacity as to provide a reasonable response of value actuator 17 in the closing direction of the valve 16.

Thus, orifice means 104 serves as a means of venting control pressure in chamber 80 to the atmosphere whenever the pilot poppet valve 94 approaches its valve seat 95.

Figure 5:
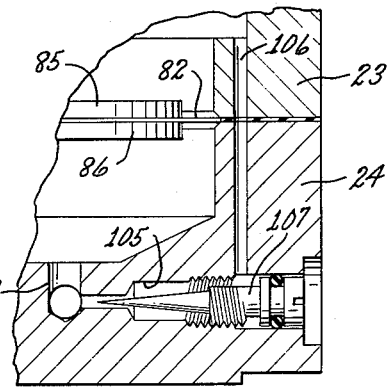
FIGURE 5 is a fragmentary, cross-sectional view taken substantially on line 5—5 of FIGURE 3.

A branch passage 105 is formed in the housing member 24 in the manner illustrated in FIGURES 3 and 5 and is interconnected at one end thereof to the passage means 103 previously described and to a passage means 106 in the housing member 23 leading to the chamber 81 for a purpose hereinafter described.

An adjustable needle valve 107 is disposed in the passage means 105 to control the rate of flow of fluid through the passage means 105 to the chamber 81 for a purpose hereinafter described.

The operation of the fluid system 10 as well as the controller 18 of this invention will now be described.

The valve actuator 17 is calibrated such that a 3 p.s.i. signal will just start the valve 16 toward the closed position and require a pressure of 15 p.s.i. to move the valve 16 to the closed position thereof. While this 3–15 p.s.i. signal is the commonly used signal for industrial instruments, many other signal ranges such as 3–27, 6–30, etc., can be used.

After the actuator 17 has been calibrated for the 3–15 p.s.i. signal regardless of the differential pressure desired, valve mechanism 15, 16 should be sized (port size) and characterized (poppet contour) to suit the general needs of the control job to the done.

In a typical application of the device of this invention wherein it is desired to control flow through the conduit 11 which is used in a process that requires a range of liquid flow of from 10 g.p.m. to 30 g.p.m. and an orifice 12 is selected that would have a differential pressure of 20″ of water at 10 g.p.m., then at 30 g.p.m., the differential pressure would be 180″ of water.

If orifice 12 discharges to atmosphere, this pressure is constant.

Thus, if the controller is set to 20″ of water differential pressure by the control knob 69, the controller will control the rate of liquid flow at 10 g.p.m. provided that the pressure at the inlet side of orifice 12 is 20″ of water.

Valve 15, 16 is wide open and offers no resistance to the flow of liquid through it whereby if a supply of liquid pressure of 20″ of water is fed to the inlet of valve 15, 16, the flow will be 10 g.p.m.

If for some reason the supply pressure to control valve 15, 16 increases to say 150 p.s.i. and the control valve 16 does not move, the orifice 12 is subject to a differential pressure of 150 p.s.i. and, as a result, the flow will increase considerably beyond the desired 10 g.p.m.

In order to correct for this increased flow through orifice 12, the controller 10 must cause the control valve 16 to move toward the closed position until the pressure drop across the orifice 12 at the desired 10 g.p.m. flow will be 150 p.s.i. minus the 20″ of water required for the orifice 12.

If it takes 15 p.s.i. on actuator 17 to completely close valve 16, then it may be assumed that 14 p.s.i. on actuator 17 closes valve 16 sufficiently to satisfy the required pressure drop across the orifice 12. Under this condition, the controller 10 would again establish the required 10 g.p.m. flow.

Thus, it can be seen that the differential pressure controller 10 must be capable of developing a control pressure which may vary anywhere within the range of 3 to 15 p.s.i. while the sensing diaphragm 31 is feeling a pressure that is essentially constant.

This result is accomplished by the addition of positive feedback which is applied to the upper side of diaghragm 82 which in effect cancels the negative feedback applied to the lower side of the diaphragm 82.

A time function is introduced by the restriction of the reset needle valve 107 and must be present in order to attain stability in this controller. Without this restriction, the controller output to actuator 17 would oscillate between essentially 0 p.s.i. and the supply air pressure.

When it is necessary to have the 30 g.p.m. flow, the operator turns the knob 69 to set the controller 10 to control at 180″ of water pressure. Under this condition, the liquid supply pressure to valve 16 must be 180″ of water or more to attain the desired flow.

At a liquid supply pressure of 180″ of water, the controller 10 would have an output signal of 3 p.s.i. because valve 16 must be wide open.

Again at 150 p.s.i., the controller output would be very close to 14 p.s.i. because valve 16 must provide a pressure drop of 150 p.s.i. minus 180″ of water in order to maintain the 30 g.p.m. flow rate.

Thus, it can be seen that the resulting change in pressure differential between the chambers 29 and 30 of the controller 18 will cause the diaphragm 31 to move downwardly in FIGURE 1 and carry the stem means 49 therewith to open the valve member 94 and permit a greater quantity of supply pressure to enter the chamber 80 and be fed by the conduit 100 to the actuator 17 to adjust the valve member 16.

However, as the supply pressure in the chamber 80 increases upon a further opening of the valve member 94, the pressure in the chamber 80 acts against the lower side of the diaphragm 82 to tend to move the same upwardly in opposition to the force of the pressure differential in the chambers 29 and 30 tending to move the diaphragm 31 and stem means 49 downwardly whereby the corrective action at the actuator 17 will not be great. This results from the negative feedback provided by chamber 80 acting on the lower side of the diaphragm 82.

However, should the surge through the conduit 11 be relatively long lasting, the increased pressure in the chamber 80 eventually bleeds through the needle valve 107 to the positive fedback chamber 81 whereby the pressure differential across the diaphragm 82 will be substantially equalized so that the stem 49 can be moved downwardly solely by the pressure differential across the diaphragm 31 without any resistance of the negative feedback in chamber 80 because the positive feedback in chamber 81 acting on the opposite side of the diaphragm 82 cancels the negative feedback being applied to the underside thereof by the chamber 80. In this manner, a relatively large corrective action can take place by the supply pressure in chamber 80 being fed to the actuator 17 to move the valve member 16 closer to the valve seat 15 to decrease the flow of fluid through the conduit 11 to the orifice means 12 whereby the pressure differential across the orifice means 12 will return to the selected setting of water differential required by the controller 18.

Accordingly, the immediate reaction of the controller 18 to the change in pressure differential across the measuring diaphragm is that which is typical of a wide band (low gain) controller with its inherent stability because of the negative feedback on the feedback diaphragm. However, the delayed reaction of the positive feedback to the feedback diaphragm renders the controller 18 of the type which is typical of a very narrow band (high gain) controller which practically eliminates offset without loss of stability.

Thus, it can be seen that by adjusting the knob 69 to the desired adjusted position thereof, the controller 18 can maintain a selected pressure differential across the orifice means 12 in the conduit 11 at any selected water pressure differential within the limits of the controller 18 regardless of the p.s.i. of the fluid passing through the conduit 11 as the output signal from the chamber 80 to the actuator 17 will be proportional to the load applied to the measuring diaphragm 31 by the range spring 63.

For example, the controller 18 illustrated in the drawings is adapted as a range of approximately 20 to 300" of water differential and is adapted to withstand a maximum static pressure of 150 p.s.i. applied to either side of the measuring end thereof.

In order to prevent overstressing of the bellows assembly 38 and, thus, prevent damage to the same, stop means are provided for the controller 18 to not only limit the downward movement of the bellows assembly 38, in FIGURE 1, but also upward movement thereof should the chamber 30 have a higher pressure than the chamber 29.

For example, reference is made to FIGURE 1, wherein a sleeve 110 is disposed inside the bellows construction 47 and has external threads 111 disposed in threaded relation with internal threads 112 on the bellows head 41 whereby the sleeve 100 can be adjusted relative to the housing 19, the sleeve 110 being held in its adjusted position by a lock nut 113.

An adjustable stop member 114 is carried on the threaded end 59 of the stem member 50 whereby downward movement of the stem 49 relative to the housing 19 is limited by the stop member 114 engaging the upper end 115 of the sleeve member 110. Thus, it can be seen that the stop members 114 and 110 cooperate together to limit downward movement of the diaphragm 31 relative to the housing 19 to prevent damage to the bellows assembly 38 should the pressure differential between the chambers 29 and 30 be too great.

In regard to limiting upward movement of the diaphragm 31 relative to the housing 19, the washer-like member 54 carried by the stem means 49 is adapted to engage the lower end 116 of the sleeve 110 should the pressure in the chamber 30 exceed the pressure in the chamber 29 to any appreciable degree.

Accordingly, it can be seen that not only does this invention provide an improved fluid system or the like, but this invention also provides an improved differential pressure controller for such a system or the like.

However, while the differential pressure controller 18 of this invention has been previously described and illustrated in connection with the system 10, it is to be understood that the controller 18 of this invention can have many uses independent of the system 10.

For example, the controller 18 of this invention could control a temperature input or a pressure input, if desired.

While the form of the invention now preferred has been disclosed as required by the statutes, other forms may be used, all coming within the scope of the claims which follow.

What is claimed is:

1. A controller or the like comprising a housing having two cavities separated from each other, a first flexible diaphragm dividing one of said cavities into first and second chambers and carrying stem means, an adjustable knob carried by said housing, a tension spring operatively connected to said knob and to said stem means to bias said first diaphragm in one direction, stop means to limit movement of said first diaphragm in either direction, a second flexible diaphragm dividing the other cavity into third and fourth chambers and being operatively interconnected to said stem means, means defining first passage means in said housing and leading from the exterior of said housing to said third chamber, valve means disposed in said first passage means and being operated by movement of said second diaphragm, orifice means interconnecting said third chamber with said exterior of said housing, means defining second passage means in said housing and leading from said third chamber to said fourth chamber, and adjustable valve means disposed in said second passage means.

2. A controller or the like as set forth in claim 1 in which said means defining second passageway means provides means to apply a positive feedback to said controller to equalize the negative feedback of said third chamber.

3. A controller or the like as set forth in claim 2 wherein said last-named means applies said positive feedback to said second diaphragm.

4. A controller or the like as set forth in claim 3 wherein said positive feedback is taken from said third chamber.

5. A controller or the like as set forth in claim 1 wherein said adjusting knob is adapted to telescope relative to said controller and wherein said stem means is a shaft operatively interconnected to said tension spring.

6. A controller or the like as set forth in claim 5 wherein said shaft has flange means extending outwardly therefrom and received between coils of said tension spring to permit rotation of said knob relative to said spring.

7. A controller or the like as set forth in claim 1 wherein said stem means has an outwardly directed flange means received between coils of said tension spring to operatively interconnect said spring to said stem means.

8. A controller or the like as set forth in claim 1 wherein said stop means comprises a first member fixed from movement relative to said controller, and a second member movable with said first diaphragm to engage said first member to limit movement of said first diaphragm in one direction.

9. A controller or the like as set forth in claim 8 wherein said stop means includes a third member carried by said first diaphragm and engageable with said first member to limit movement of said first diaphragm in the other direction.

10. A controller or the like as set forth in claim 1 wherein said first member is adjustable relative to said controller and said second member is adjustable relative to said first diaphragm.

References Cited by the Examiner

UNITED STATES PATENTS

| | | | |
|---|---|---|---|
| 508,133 | 11/1893 | Gold | 92—100 |
| 1,745,059 | 1/1930 | Rush | 137—486 |
| 1,795,201 | 3/1931 | Dashwood | 137—505.28 |
| 1,874,704 | 8/1932 | Johnson | 137—153.5 |
| 2,162,779 | 6/1939 | Leutwiler et al. | 137—495 |
| 2,584,455 | 2/1952 | Hughes | 137—85 |

FOREIGN PATENTS 544,643  4/1942  Great Britain.

MARTIN P. SCHWADRON, *Acting Primary Examiner.*

M. CARY NELSON, *Examiner.*